W. W. STODDARD.
BOLT SAWING MACHINE.
APPLICATION FILED NOV. 19, 1913.

1,201,525.

Patented Oct. 17, 1916.
5 SHEETS—SHEET 1.

Fig. 1.

Witnesses
G. M. Spring.
C. H. Crawford

Inventor
Wallace W. Stoddard,
By
his Attorney

W. W. STODDARD.
BOLT SAWING MACHINE.
APPLICATION FILED NOV. 19, 1913.

1,201,525.

Patented Oct. 17, 1916.
5 SHEETS—SHEET 2.

W. W. STODDARD.
BOLT SAWING MACHINE.
APPLICATION FILED NOV. 19, 1913.

1,201,525.

Patented Oct. 17, 1916.
5 SHEETS—SHEET 3.

W. W. STODDARD.
BOLT SAWING MACHINE.
APPLICATION FILED NOV. 19, 1913.

1,201,525.

Patented Oct. 17, 1916.
5 SHEETS—SHEET 4.

W. W. STODDARD.
BOLT SAWING MACHINE.
APPLICATION FILED NOV. 19, 1913.

1,201,525.

Patented Oct. 17, 1916.
5 SHEETS—SHEET 5.

Witnesses
G. M. Spring.
C. H. Crawford

Inventor
Wallace W. Stoddard,
By Richard Eleven,
his Attorney

UNITED STATES PATENT OFFICE.

WALLACE W. STODDARD, OF BINGHAM, MAINE.

BOLT-SAWING MACHINE.

1,201,525.  Specification of Letters Patent.  Patented Oct. 17, 1916.

Application filed November 19, 1913. Serial No. 801,968.

*To all whom it may concern:*

Be it known that I, WALLACE W. STODDARD, a citizen of the United States, residing at Bingham, in the county of Somerset and State of Maine, have invented certain new and useful Improvements in Bolt-Sawing Machines, of which the following is a specification.

My invention relates to improvements in bolt sawing machines for radially sawing a bolt to form last blocks or for any other purpose for which such radial sawing may be useful.

It is one of the objects of my invention to provide a machine whereby small blocks can be sawed from relatively large bolts having poor centers, and where relatively large bolts would otherwise provide for sawing last blocks, the object being to produce from the radial cut in a bolt, a product which is solid and useful and which is formed of only that part of the bolt which is not decayed.

A further object is to provide a machine which will saw a bolt to its center, if the center is good, thereby utilizing all of the "white" or outer part of the log or bolt, which is of most service for last block purposes.

A further object is to provide a machine of this character which is to a great extent automatic and which can be set to completely subdivide a bolt, radially thereof, into sections of uniform size, or which can be adjusted so that if one portion of the bolt presents a bad center, a reduced size or section can be sawed which will comprise only the intact or good portions of the bolt.

A still further object is to provide a machine with a bolt holder to which revolving feeding movement is imparted so that a bolt can be completely subdivided, and the machine automatically brought to a position of rest, before the bolt holder is revolved throughout a complete revolution, this feature of the invention enabling me to avoid the use of a slotted platform type of bolt support.

Other features of novelty will be more fully described in connection with the accompanying drawings and will be more particularly pointed out and ascertained in and by the appended claims.

In the drawings: Fig. 10 is a plan view of still another element thereof.

Like characters of reference designate similar parts throughout the different figures of the drawings.

As illustrated, my invention includes a main frame, of generally rectangular form, having a carriage side 1, a drive side 2, a saw end 3 and an adjusting end 4. The saw end is somewhat elevated with respect to the remainder of the frame and in bearings 5 and 6 I journal a main drive or saw shaft 7. Drive may be imparted to the saw shaft or main shaft 7 by means of a pulley 8 and a belt 9. A countershaft 10 is journaled in suitable bearings 11 and 12 and carries on its outer end a pulley 13. Drive is imparted to the pulley 13 and the countershaft 10 by a belt 14 which is trained over the pulley 13 and a pulley 15, which latter is mounted on the main shaft 7. The countershaft 10 is drivenly connected with a worm shaft 16, by means of bevel gears 17 and 18, mounted respectively on the countershaft 10 and worm shaft 16. The worm shaft 16 is journaled in bearings 19 and 20 and is provided with worm 21 which meshes with a worm wheel 22. Worm wheel 22 is loosely mounted upon a carriage-actuating or crank shaft 23 which is journaled in bearings 24 and 25 on the main frame.

Figure 11:
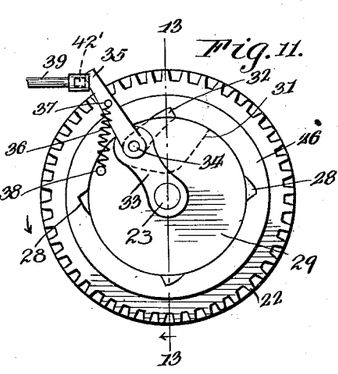
Fig. 11 is a sectional view on line 11—11 of Fig. 3 of a clutch drive.
Figure 12:
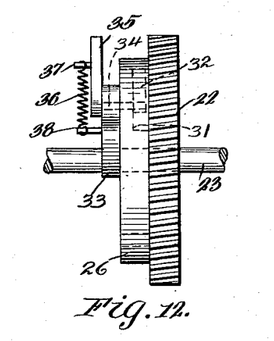
Fig. 12 is a view of the drive clutch looking from the right of Fig. 11.
Figure 13:
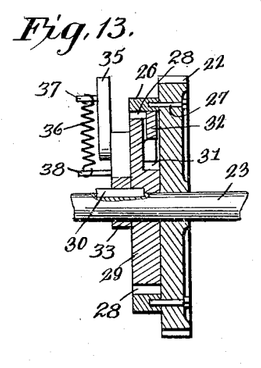
Fig. 13 is a sectional view thereof on line 13—13 of Fig. 11.

The worm wheel 22 carries a clutch ring 26, which latter is bolted to the worm wheel 22, as shown at 27, and said clutch ring is provided with clutch-dog recesses 28 which are spaced apart equi-distantly as shown in Fig. 11. A clutch dog carrier 29 is keyed on crank shaft 23, as indicated at 30, and is provided with a recess 31 to accommodate movement of the free end of a dog 32 in its movement out of the dog-engaging recesses 28. The carrier 29 is provided with a radial enlargement 33 in which a spindle 34 is journaled, the inner end of the spindle projecting into the space 31 for connection with dog 32. A lever 35 is mounted on the outer end of the spindle and is urged into a position to move the dog 32 into the notches 38 by a spring 36. One end of the spring 36 is connected at 37 with the lever 35 and the other end of the spring is connected with the carrier at 38.

It will be seen from the foregoing description that when the dog 32 is in the position shown in Fig. 11, drive will be transmitted from countershaft 10 through clutch ring 26 and dog 32 and its carrier 29 to the crank shaft 23. When the dog 32 is moved out of engagement with any one of the recesses 28, then the crank shaft 23 will not be rotated, notwithstanding the continuous drive to main shaft 7.

I will next describe the device for throwing the dog out of a clutch position with respect to the clutch ring 26 to disconnect crank shaft 23 from its drive. A rock shaft 39 is suitably journaled in the adjusting end 4 of the frame, as at 40, and also at 41, and an operating lever 42 is mounted near one end of said shaft 39. At the other end of said shaft 39 a dog-engaging arm 42' is mounted so as to lie in the path of bodily rotation of the lever 35. When the lever 42 is swung to rock the shaft 39 in such a position as to dispose the arm 42 in the path of bodily rotation of the lever 35, as shown in Fig. 11, it will move the lever 35 so as to rock the pawl 32 out of engagement with the clutch ring 26. A circular saw 43 is fixed on the main shaft 7 and a saw of sufficient diameter is employed so that its radius will exceed the radius of any bolt of usual size.

Figure 14:
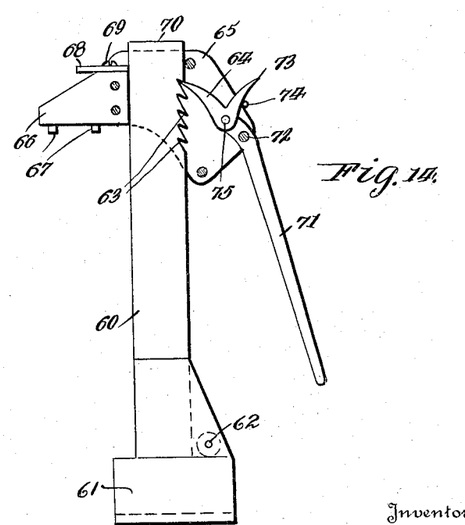
Fig. 14 is an enlarged view, partly in section, of my improved bolt holder.

On the shaft 23 I provide a crank 44 which is connected by a link 45, to a carriage 47, at 48. The carriage 47 is provided with pairs of wheels 49 and 50 which run on carriage tracks 51 and 52, respectively, mounted on the carriage side 1 of the main frame. In bearings 53 and 54, on the carriage 47, I rotatably mount a shaft 55, which I will term the feed shaft. On the upper end of said shaft I non-rotatably mount a bolt support 56, which is in the form of a bracket and which is provided with a hub 57 keyed on the feed shaft 55, as indicated at 58. The bracket 56 is provided with a bolt-supporting top portion 59, on which the bolt of wood is disposed to be sawed, and on said supporting top I slidably and adjustably mount a bolt clamping device. As shown, said bolt clamping device comprises a clamp standard 60, engaging the bolt support at 61, and adapted to be adjustably clamped thereon by means such as a screw 62. Near the upper portion of the standard, and on the rear margin thereof, I provide teeth 63 for engagement by a clamping pawl 64. As will be seen more particularly by reference to Fig. 14, the clamping device comprises a bolt-clamping member 65, which is slidable vertically on the clamp standard 60, and which projects forwardly thereof, as at 66 so as to overhang and engage the top of the bolt. Bolt-engaging pins 67 are provided to embed into the bolt and firmly anchor the same on the support 59. In order to hold the clamping member in an upper position on the standard 60, I provide means which may comprise a slidable retainer 68, which is slidably mounted by a screw 69, on 66, and which can be adjusted to engage the top 70 of the standard 60 so as to hold the clamp member 65 in an upper position while the bolt is being adjusted in place on the support 69. After the bolt is adjusted in place and the retainer 68 is moved to the position shown in Fig. 14 so that the clamp member 65 can be lowered downwardly on top of the bolt, then the pawl 64 is actuated by a lever 71, pivoted at 72 to the clamp member 65, to engage the pawl 64 with the teeth 63 and force the pins 67 into the end of the bolt. The pawl 64 has a portion 73 to facilitate its adjustment by hand into engagement with the desired teeth. A spring 74 holds the pawl 64 in a clamp-member tightening position when the point of pivotal mounting 75, of the pawl 64 to the lever 71, has passed a dead center with respect to the point of engagement of the pawl with the teeth and the pivot 72.

Figure 1:
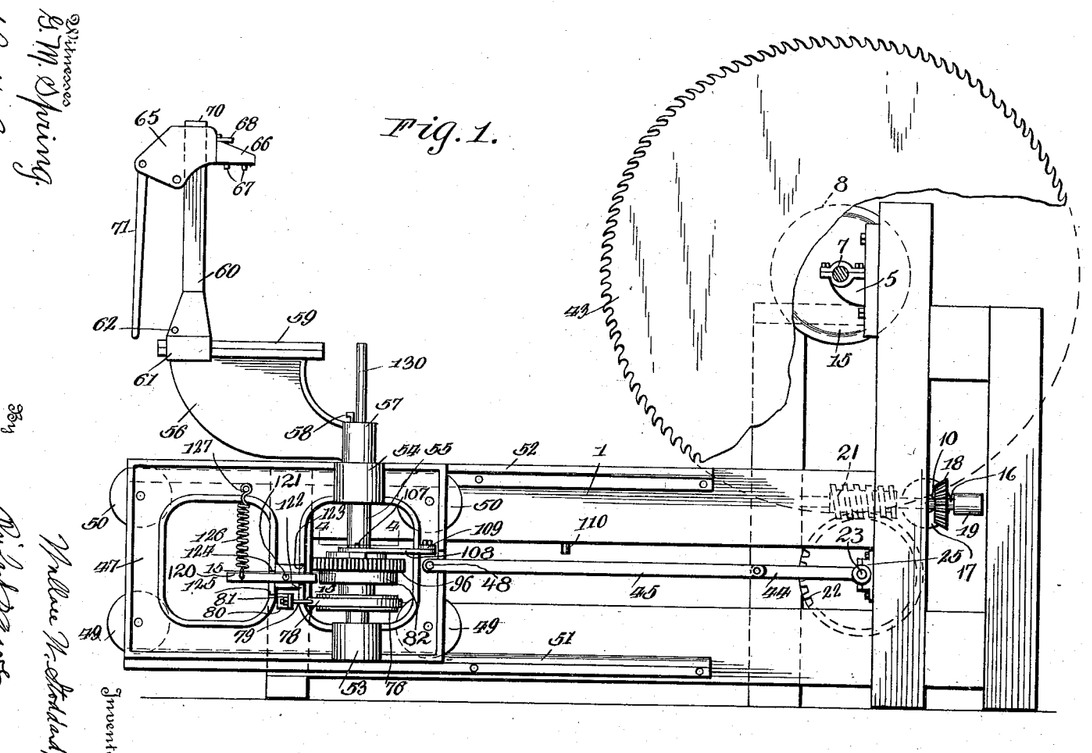
—Figure 1 is a view in side elevation illustrative of a bolt sawing machine embodying one form of my invention.

The feed shaft 55, as will be seen more particularly by reference to Fig. 1, is disposed at right angles to the saw or main shaft 7 and the vertical axis of the feed shaft 55 lies substantially in the plane of the saw 43. When a bolt is first positioned, the first cut will be made with the bolt-supporting arm 56 lying closely adjacent to and on the outside of the saw 43, with respect to the frame 1. The last cuts will be made with the bolt-supporting arm lying adjacent the saw 43 but on the inside thereof with respect to the frame 1, the adjustment of the arm 56 to position the bolt for the several cuts, and to complete the sawing operation, being less than a complete circle.

In order to hold the feed shaft 55 in its adjusted position, I provide means which may include a band brake wheel 76 which is keyed on the feed shaft as indicated at 77. A brake band 78 peripherally engages the brake wheel 76 and has its ends secured to the carriage 47, one end being shown secured thereto by adjustable means comprising a threaded terminal 79, for the band 78, adjustably held in a lug 80 by a nut 81.

Figures 4, 5, 6, 7, 8:
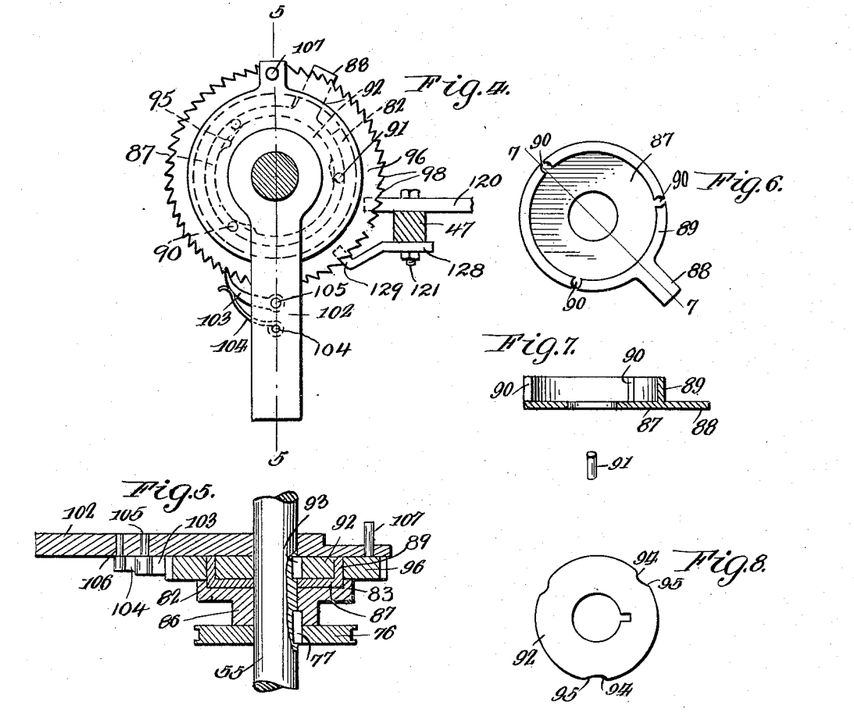
Fig. 4 is a sectional view on line 4—4 of Fig. 1, showing an improved form of friction clutch feed mechanism.
Fig. 5 is a sectional view on line 5—5 of Fig. 4.
Fig. 6 is a plan view of one of the elements of my improved friction clutch mechanism.
Fig. 7 is a sectional view on line 7—7 of Fig. 6 and also illustrating one of the clutch pins.
Fig. 8 is a plan view of another element of the clutch mechanism.
Figure 9:
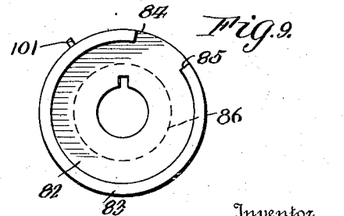
Fig. 9 is a plan view of another element forming a part of my improved clutch feed mechanism.

I will next describe my improved friction-clutch feed mechanism whereby manipulation of the feed shaft 55 is effected to carry out necessary adjustments for the bolt support. A clutch arrester, preferably in the form of a cup 82, as shown more clearly in Fig. 9, is provided with a shallow flange 83, which flange 83 is interrupted to form clutch-limiting shoulders 84 and 85. Said cup 82 is provided with a hub 86 which is keyed on the feed shaft 55 by the key 77 which locks the brake wheel 76 thereto. A cage 87 is freely rotatable about shaft 56 and sets in the cup 82 and is provided with an arm 88 which projects between the shoulders or abutments 84 and 85 so that the cage will be limited in its rotative movement, with respect to the cup 82, by the distance between the shoulders 84 and 85. The cage 87 is provided with a flange 89 which is provided with three equidistantly spaced roller-holding cavities 90 for rotatably retaining rollers such as are indicated in Fig. 7 at 91. Said rollers 91 are of sufficient diameter to project inwardly and outwardly, a very slight distance, from the flange 89, radially, for frictional engagement of parts located interiorly and exteriorly of the flange 89. Interiorly of the cage 87 I dispose a clutch hub 92, which is keyed to the feed shaft 55 at 93, and which is provided with three equidistantly spaced and peripherally disposed anti-friction-roller cavities 94. The cavities 94 extend outwardly and merge into the periphery of the hub 92 to form cam portions 95, against which the rollers 91 are pinched or gripped to render the clutch operative, in a manner which will presently appear. Resting upon the flange 83 of the cup 82 and surrounding the cage 87, is a feed wheel 96 provided with a continuously smooth roller-gripping interior 97 and peripherally disposed ratchet teeth 98. When the feed wheel 96 is actuated in a clockwise direction, with respect to Fig. 4, it will engage the rollers 91 and pinch the same frictionally upon the inclined portions 95 of the hub 92 so as to thereby impart rotative movement from the wheel 96 through the rollers and hub 92 to the feed shaft 55. A spring 99, connected to arm 88, at 100, and to a stud 101 on cup 82, normally urges the cage 87 in a direction to cause the rollers 91 to ride up on the inclines 95 so that the rollers 91 will be in position for engagement by the feed wheel 96 to be pinched for frictional grip by said wheel against the inclines 95 to impart rotation to the feed shaft 55. Such movement under action of spring 99, will cause the arm 88 to be moved toward shoulder or abutment 84. A feed arm 102 is rotatably mounted upon feed shaft 55 and is disposed upon the feed wheel 96 and the friction clutch hub 92. Said feed arm 102 is provided with a pawl 103 which is held in engagement with ratchet teeth 98 by a spring 104. The pawl 103 is mounted on the arm 102 at 105, and the spring 104 is mounted at 106. The feed arm 102 is limited in its movement by a pin 107 thereon which engages a slotted arcuate arm 108 mounted at 109 on the carriage 47.

I will next refer to the regulating means for the feed arm 102 whereby the same may be shifted in accordance with the size of the last blocks to be cut or sawed from the bolt. On forward movement of the carriage 47 under the action of crank 44, the feed arm 102 will strike an arrester or feed-setting pin 110, on the carriage side 1 of the frame, so that during completion of movement of the carriage toward the saw 43, the feed arm 102 will be arrested and thereby cause the pawl 103 to pass idly over the teeth of wheel 96. Upon retractive movement of the carriage away from the saw, after a block has been cut, the feed arm 102 will engage a feed abutment, indicated as a whole at 111, to arrest movement of the arm 102, with the carriage, away from the saw, thereby causing the pawl 103 to advance the feed wheel 96. Such advancing movement of the feed wheel 96 will cause rotative movement of the bolt support in the direction of arrow $a$ of Fig. 3, for positioning the bolt for the next cut.

The feed abutment is preferably adjustable so as to vary the extent of movement of the feed arm 102 under contact with the feed abutment. In the present construction, the abutment is in the form of a lever having a feed arm-engaging portion 112, and pivotally mounted at 113 to a bracket 114. The abutment lever is preferably a bell-crank lever and the remaining arm 115 extends through the adjusting side 4 of the frame into the path of a lever 116. The lever 116 is pivoted at 117, and may be locked in adjusted positions by a device 118 thereon adapted for engagement with a toothed rack 119, the latter being mounted on frame portion 4.

Figures 3, 15:
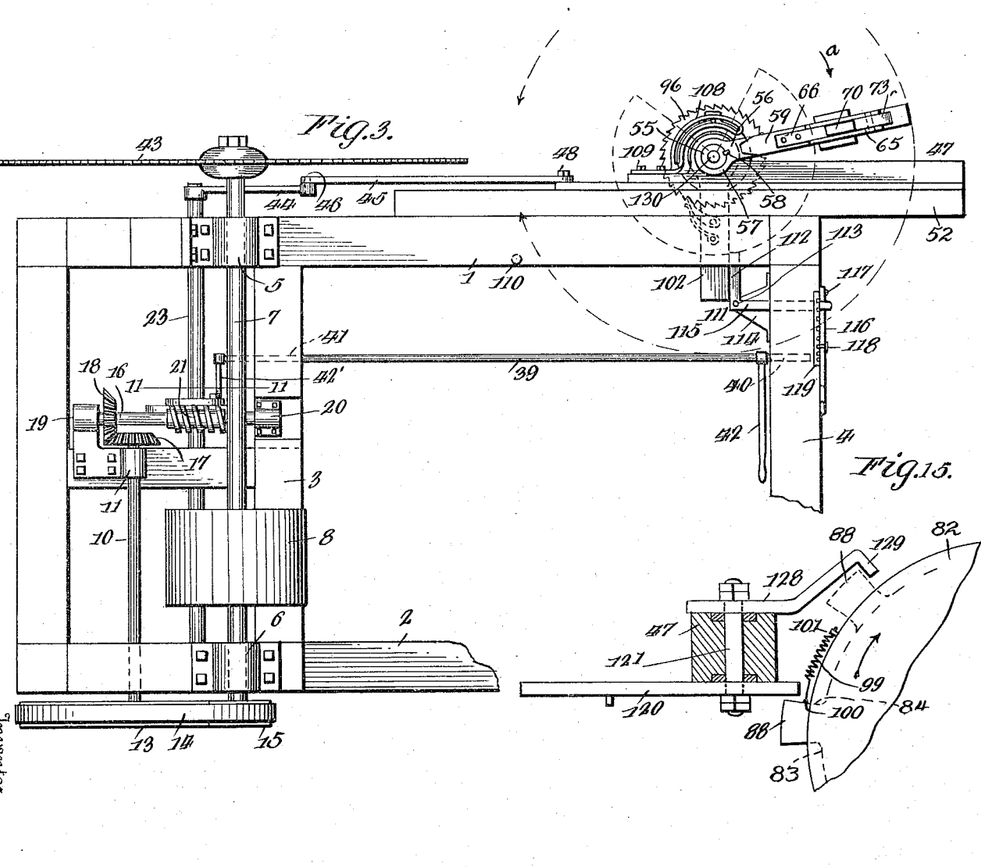
Fig. 3 is a plan view thereof.
Fig. 15 is a sectional view on line 15—15 of Fig. 1.

When the bolt support 56 is in a position to dispose the standard 60 closely adjacent the outside of the saw 43, with respect to the carriage side 1 of the frame, which is the starting side, or point, then arm 88 will be in the dotted-line position shown in Fig. 15. When the bolt has been completely cut into blocks and the standard 60 is adjacent the saw 43 and on the inside thereof with respect to the carriage side 1 of the frame, then the arm 88 will be in the full-line position shown in Fig. 15. The machine will continue to run and automatically saw a bolt into last blocks of uniform size when the lever 16 is retained in one adjustment and the lever 42 is not moved to disconnect the crank shaft 23. Therefore when the bolt has been completely subdivided into blocks, I provide means for preventing advance of the support 56 and standard 50, into such a position that it could be advanced against the teeth of the saw, or beyond the position closely adjacent the inside of the saw on forward movement of the carriage.

It will be understood, from the foregoing description, that the spring 99 will normally actuate the cage 87 to advance the rollers 91 upwardly on the incline 95 of the hub 92. This will always provide an adjustment of the friction mechanism such as will permit the feed wheel 96 to grip the rollers when it is actuated by the feed arm 102. Now when the last cut has been effected and the carriage returned from the last cut, I provide means for engaging the arm 88 so as to hold the same against movement with the remaining parts with which it is associated, so as to thereby move the rollers 91 into the cavities 94 and prevent any gripping action by the feed wheel 96.

On the carriage 47 I pivotally mount a stop lever 120, preferably on a bolt 121, which extends through the carriage, as will be seen by reference to Fig. 15. The lever 120 is disposed in cut away portions of the carriage forming shoulders 122 and 123, on one side of the bolt, and shoulders 124 and 125 on the other side of the bolt 121. A spring 126 is connected with the lever 120 and also with the carriage 47, at 127, so as to normally hold the free end of the lever 120 in engagement with the shoulder 122. This will dispose the free ends of the lever 120 in the path of the arm 88 so that when a bolt has been completely subdivided or sawed into blocks, the arm 88 will be arrested so as to render the friction-clutch mechanism inoperative to further turn the bolt support 56 and shaft 55. In other words, this contact prevents further feeding movement being imparted to the shaft 55 by reason of the fact that by arresting 88 the rollers 91 will be returned to the cavities 94 so that any rotation of the feed wheel 96 will merely cause the inner surface 97 to pass freely about the rollers.

It will be understood that when the arm 88 is in the position shown in Fig. 15, the bolt support will be in a position adjacent the inside of the saw 43 and the throwout of the friction clutch would prevent the further feeding movement of the bolt support. Of course when the bolt is completely severed into blocks, the operator will actuate the clutch throwout means or lever 42 to arrest movement of the crank shaft 23 and stop the carriage for positioning a new bolt therein.

In order to position the support for clamping a new bolt therein, the operator will depress the longer end of lever 120, with his foot, in order to raise the free end of said lever so as to permit the arm 88 to pass thereunder by reason of manual turning movement of the bolt support.

In order to limit movement of the support 57, manually, so as to correctly position the support 56 the proper distance outside of the saw 43 for the first cut, I provide limiting means for engagement with the arm 88 which will automatically arrest movement of the support 56 after the arm 88 passes lever 120. Immediately upon release of the lever 120 by the operator's foot, the spring 126 will return lever 120 to the position shown in Fig. 1.

I fix on bolt 121 an initial positioning arm 128 which is provided with a bent terminal end 129 which normally lies in the path of the arm 88 so that after the lever 120 is turned by the spring 126, the lever 128 will be shifted into the path of the arm 88 before the arm 88 reaches the end 129. It will be understood that the brake band 78 and brake wheel 76 will hold the feed shaft 55 against accidental free movement in either direction, but the arm 128 is especially intended to hold the supports 56 in the correct position during the operation of clamping a new bolt thereon. It will be understood that immediately upon release of the arm 88 by the free end of the lever 120, the spring 99 will advance the arm 88 so as to throw the rollers onto the inclines 95 in position for engagement by the inner face 97 of the feed wheel 96 when the operation is again commenced.

Of course the terminal end 129 would prevent rotative movement of the arm 88 in the direction of the arrow shown in Fig. 15, if the machine were started with the parts in the position shown in dotted lines, and therefore after a bolt has been clamped in place, and before the machine is started, the operator will depress the longer end of arm 120 and slightly advance the forward end of arm 88 beneath the raised terminal end 129 and thereafter release lever 120. In the first movement, arm 88 will slide under the terminal end 129 and thereafter feeding movement will be imparted until the arm 88 again and finally reaches a position in front of the lever 120.

Figure 2:
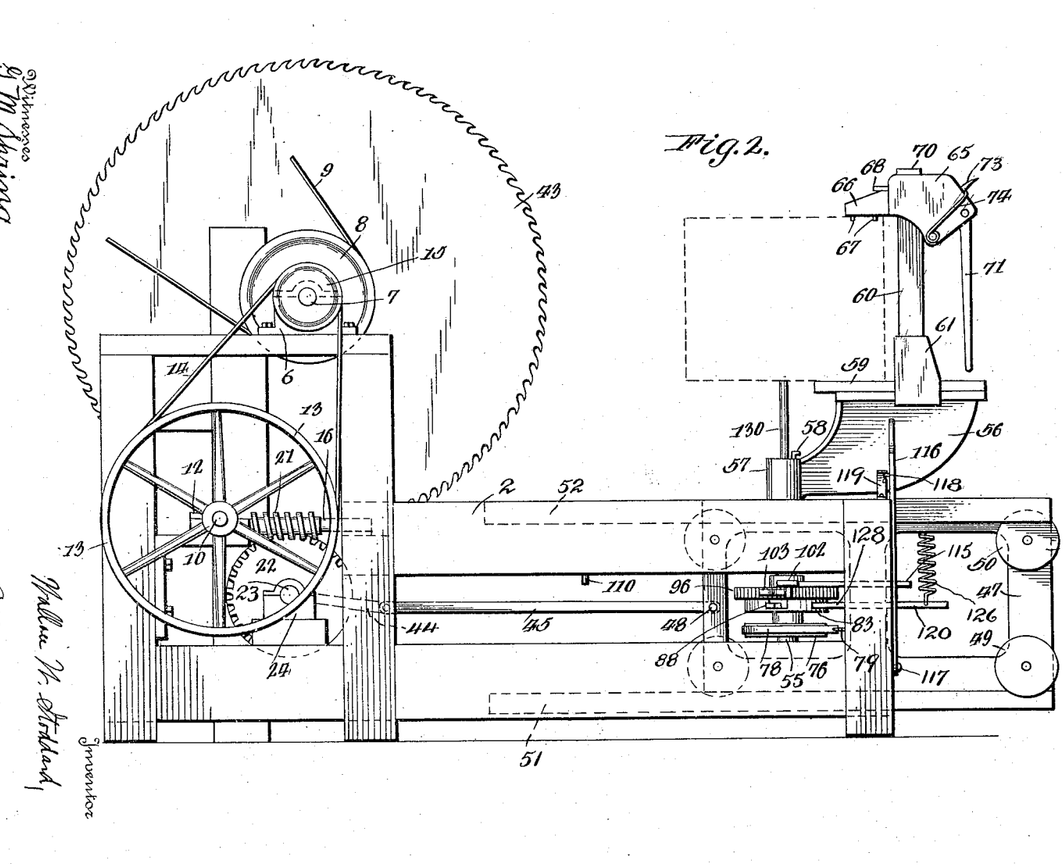
Fig. 2 is a view in side elevation looking from the side opposite to that shown in Fig. 1.

It will be noted, especially by reference to Fig. 2, that the bolt is gripped or clamped radially outwardly from its center so that the bolt can be advanced on the saw until the saw reaches the center of the bolt thereby enabling me to saw a complete segment, or segmental block therefrom. This advantage is due to the fact that the bolt is gripped not only laterally or radially outwardly from its center, but on upper and lower areas reduced with respect to the size of the blocks or segments cut from the bolt so that when the cutting operation is finished, the last completed segment will be gripped by the support and may be substantially the same in size as the previous segments cut from the bolt. I may project the feed shaft 55, or a reduced end 130 thereof so as to engage the bolt centrally, to support the same.

If a bolt is good throughout and does not have a bad center, all the blocks can be cut of the same size and the machine will automatically subdivide a bolt by continuous operation, the size of the segment being fixed by the adjustment of the abutment lever 111, or the projection of the arm 112 thereof with respect to the pivot 113. If the operator should note that the bolt presented a bad area, the lever 116 could be adjusted to reduce the size of the next block to be cut, even without arresting the machine.

It will be further noted, that if a bolt presents a bad center, the abutment lever 111 can be adjusted so as to alter the feeding movement imparted to the arm 102 so that last blocks of a relatively small size could be cut from a bolt which would otherwise provide for last blocks of a relatively large size.

It is believed that the operation and utility of the device of my invention will be clearly understood from the foregoing description, and while I have herein shown and described one specific embodiment thereof, I do not wish to be limited thereto except for such limitations as the claims may import.

I claim:—

1. A bolt sawing machine comprising a saw mounted at a fixed point, a carriage mounted to be capable of movement toward and from the saw, a feed shaft on the carriage, a bolt supporter secured on said shaft to present a bolt for radial cuts by the saw, a ratchet feed wheel rotatable about said shaft, a friction feed clutch on said shaft to be normally movable with said ratchet wheel to impart turning movement to said feed shaft and to consequently shift the bolt for successive cuts, means mounted on the shaft to be actuated upon movement of the carriage to impart the desired step by step turning movement to the shaft through the ratchet wheel, and stop means engageable with a part of the clutch by the rotation of the clutch to release the clutch and permit the ratchet wheel to move idly when the shaft and consequently the bolt supporter have been moved slightly less than a complete turning revolution.

2. A bolt sawing machine comprising a saw mounted at a fixed point, a carriage mounted to be capable of movement toward and from the saw, a bolt supporter secured on said shaft to turn therewith and to present a bolt for radial cuts by the saw as the shaft is turned and the carriage is given movement, a friction feed clutch secured on said shaft, a ratchet feed wheel mounted to be capable of rotation above said feed clutch and to be normally frictionally held thereby to transmit turning movement to said feed shaft as the ratchet feed wheel is turned, ratchet means mounted on the shaft to engage with the ratchet feed wheel and arranged to be actuated upon movement of the carriage to impart the desired step by step turning movement to the shaft through the ratchet wheel to cause the bolt to be presented for successive cuts by the saw, stop means to be engaged by a part of said clutch to release the same from engagement with the ratchet feed wheel and hold the shaft against movement while permitting turning of the ratchet wheel on the clutch means, and means to release said stop to permit turning of the bolt supporter for proper operative movement with a new bolt.

3. A bolt sawing machine comprising a saw mounted at a fixed point, a carriage mounted to be capable of movement toward and from the saw, a bolt supporter secured on said shaft to turn therewith and to present a bolt for radial cuts by the saw as the shaft is turned and the carriage is given movement, a friction feed clutch secured on said shaft, a ratchet feed wheel mounted to be capable of rotation above said feed clutch and to be normally frictionally held thereby to transmit turning movement to said feed shaft as the ratchet feed wheel is turned, ratchet means mounted on the shaft to engage with the ratchet feed wheel and arranged to be actuated upon movement of the carriage to impart the desired step by step turning movement to the shaft through the ratchet wheel to cause the bolt to be presented for successive cuts by the saw, stop means to be engaged by a part of said clutch to release the same from engagement with the ratchet feed wheel and hold the shaft against movement while permitting turning of the ratchet wheel on the clutch means, means to release said stop to permit turning of the bolt supporter for proper operative movement with a new bolt, friction brake means connected with said feed shaft to normally hold the same against free turning movement, and a stop to properly position the bolt supporter for the initial cut in a bolt carried thereby.

4. A bolt sawing machine comprising a frame, a saw mounted on said frame, to operate at a fixed point, a carriage pivotally mounted on said frame to be capable of movement toward and from the saw, a feed shaft mounted on the carriage to extend at right angles to the line of movement of the carriage, a bolt supporter secured on said shaft to present a bolt for radial cuts by the saw as the carriage is moved toward the same, a clutch hub secured on said feed shaft, a ratchet feed wheel mounted around the hub to be capable of turning movement with respect thereto, a cage mounted between said hub and the ratchet feed wheel and provided with engaging means to normally frictionally hold said ratchet wheel to impart turning movement to said feed shaft through the hub, ratchet means mounted on the shaft to be capable of swinging movement and to be actuated as the carriage is moved to cause step by step turning movement to be transmitted to the feed shaft through the ratchet wheel and the clutch hub to cause a bolt to be presented for the spaced apart radial cuts, an arm formed to extend from said clutch cage, and stop means arranged to be engaged by said arm to release the ratchet wheel from the clutch hub and to permit the ratchet wheel to move idly when the shaft has been given a sufficient turning movement to present the bolt for the desired number of radial cuts.

5. A bolt sawing machine comprising a frame, a saw mounted on said frame to operate at a fixed point, a carriage mounted in guideways on said supporting frame to be capable of movement in a horizontal path toward and from the saw, a feed shaft mounted in vertical arrangement on said carriage, an adjustable bolt supporting means secured on said shaft to turn therewith and to present a bolt for radial cuts by the saw, a friction clutch hub secured on said shaft, a cage mounted around said hub and provided with frictional engaging means adapted to normally bear against the hub, a ratchet feed wheel mounted around said cage to be normally engaged by said friction means to hold the ratchet wheel to turn the feed shaft through the clutch hub, a feed arm mounted on said shaft to be capable of swinging movement and provided with a ratchet dog engaging with the teeth of said ratchet wheel, adjustable means to cause swinging of said feed arm to rotate the clutch wheel in step by step movement as the carriage is given return movement from the position at which the saw sinks a radial cut into the bolt, an arm carried by said cage to extend from the clutch mechanism, brake means arranged in conjunction with said feed shaft to normally hold the same against idle movement, means mounted to engage with the arm of the clutch cage to release the friction means from the ratchet wheel when the bolt supporter has been given sufficient turning movement to present the bolt for the desired number of radial cuts, while permitting idle movement of the ratchet wheel, means to release said stop means, and gage means to permit setting of the bolt supporter manually in a position to present the bolt for the first cut by the saw, which means is capable of movement to the inoperative relation to actuate the parts by which the clutch disengaging stop is released.

In testimony whereof I affix my signature in presence of two witnesses.

WALLACE W. STODDARD.

Witnesses:
 H. A. COLEMAN,
 W. B. GOODRICH.

Copies of this patent may be obtained for five cents each, by addressing the "Commissioner of Patents, Washington, D. C."